(12) United States Patent
Lamperth et al.

(10) Patent No.: US 8,022,593 B2
(45) Date of Patent: Sep. 20, 2011

(54) ELECTRICAL MACHINE

(75) Inventors: Michael Ulrich Lamperth, Woking (GB); Peethamparam Anpalahan, London (GB)

(73) Assignee: Evo Electric Ltd., London (GB)

( * ) Notice: Subject to any disclaimer, the term of this patent is extended or adjusted under 35 U.S.C. 154(b) by 70 days.

(21) Appl. No.: 12/349,285

(22) Filed: Jan. 6, 2009
(Under 37 CFR 1.47)

(65) Prior Publication Data
US 2010/0071972 A1    Mar. 25, 2010

Related U.S. Application Data

(63) Continuation of application No. PCT/GB2007/002560, filed on Jul. 9, 2007.

(30) Foreign Application Priority Data

| Jul. 7, 2006 | (GB) | 0613570.1 |
| May 17, 2007 | (GB) | 0709516.9 |
| May 18, 2007 | (GB) | 0709628.2 |

(51) Int. Cl.
*H02K 1/22* (2006.01)
(52) U.S. Cl. .......... 310/268; 310/52
(58) Field of Classification Search .......... 310/52–59, 310/64, 168, 268, 156.36
See application file for complete search history.

(56) References Cited

U.S. PATENT DOCUMENTS

| 3,018,396 A | * | 1/1962 | Colgate | 310/268 |
| 3,401,285 A | * | 9/1968 | French et al. | 310/168 |
| 3,469,134 A | * | 9/1969 | Bering et al. | 310/164 |
| 3,700,944 A | * | 10/1972 | Heintz | 310/168 |
| 4,187,441 A | * | 2/1980 | Oney | 310/112 |
| 4,371,801 A | * | 2/1983 | Richter | 310/156.36 |
| 4,578,610 A | | 3/1986 | Kliman | |
| 4,864,175 A | | 9/1989 | Rossi | |
| 5,177,392 A | * | 1/1993 | Scott | 310/268 |
| 5,245,238 A | | 9/1993 | Lynch | |
| 5,334,898 A | | 8/1994 | Skybyk | |
| 5,334,899 A | * | 8/1994 | Skybyk | 310/268 |
| 2002/0150486 A1 | | 10/2002 | Cooper | |
| 2004/0135465 A1 | | 7/2004 | Smith | |
| 2007/0046124 A1 | * | 3/2007 | Aydin et al. | 310/156.37 |

FOREIGN PATENT DOCUMENTS

| EP | 0361925 A | 4/1990 |
| EP | 1612913 A | 1/2006 |

OTHER PUBLICATIONS

International Search Report, WO2008003990, published Jan. 10, 2008.

* cited by examiner

*Primary Examiner* — Thanh Lam
(74) *Attorney, Agent, or Firm* — Novak Druce + Quigg LLP (57) ABSTRACT

An axial flux electrical machine is provided. The machine includes a plurality of rotors, each sandwiched between a respective pair of stator parts. The plurality of rotors, together with their respective stators, are axially-stacked to form a multistage machine. Heat exchangers are provided adjacent each stator to provide cooling. Each rotor disc is a composite rotor disc in which permanent magnets are embedded. The magnets are embedded in apertures through each disc so that surfaces of the magnets are flush with surfaces of the respective rotor disc.

13 Claims, 9 Drawing Sheets

ELECTRICAL MACHINE

CROSS-REFERENCE TO RELATED APPLICATIONS

The present application is a continuation of International Application No. PCT/GB2007/002560, filed Jul. 9, 2007, which was published in English pursuant to Article 21(2) of the Patent Cooperation Treaty, and which claims priority to: GB 0613570.1, filed Jul. 7, 2006; GB 0709516.9, filed May 17, 2007; GB 0709628.2, filed May 18, 2007. Said applications are expressly incorporated by reference in their entireties.

TECHNICAL FIELD

This disclosure relates to an axial-flux electrical machine. More particularly, but not exclusively, this disclosure relates to an axial-flux electrical machine for use in a hybrid vehicle.

BACKGROUND

Hybrid vehicles are vehicles in which two power sources, for example an internal combustion engine and an electric motor, play a part in supplying power for use in automotive propulsion. In some hybrid vehicles, both the engine and the motor are connectable to driveline components for supplying rotary power to wheels for driving the vehicle. In other hybrid vehicles, only the motor is connectable to the driveline components for supplying the rotary power; and the engine is used only as a prime mover for driving a generator which generates the electrical power needed to operate the motor. Examples of existing hybrid vehicles include passenger cars (sometimes referred to as "automobiles"), vans, buses and light trucks. There is also an increasing interest in incorporating hybrid vehicle technology into light rail vehicles such as trams.

In nearly all hybrid vehicles, it is desirable to minimise the size and weight of the automotive components. In passenger cars, successfully minimising the size and weight of these components results in greater room and hence comfort for the passengers, and may also improve the operating efficiency of the vehicle. The same is true in other hybrid vehicles.

At the same time, it is also desirable to maximise the power output of electrical machines used in hybrid vehicles: consumers are used to the high power output of internal combustion engines and so would be disappointed with lesser performance from hybrid vehicles. This is true of both motors and generators used in hybrid vehicles. For motors, a high mechanical power output is needed in order to provide adequate automotive propulsion; and accordingly for generators, a high electrical power output is needed in order to operate the motors at high power.

Thus, for hybrid vehicles it is desirable to use electrical machines with high power output per unit mass (often referred to as "power density" and measured in kW/kg). Unfortunately, however, existing electrical machines do not satisfy these requirements and so do not lend themselves well to use in hybrid vehicles.

An object of this invention is to address this problem.

SUMMARY

In general terms, this invention provides an electrical machine that is of the axial-flux type and that has a high power density, thereby making it suitable for use in a hybrid vehicle.

According to a first aspect of this invention, there is provided an axial-flux electrical machine including a rotor mounted adjacent at least one stator, the rotor being mounted on a rotatable member for rotation relative to the stator such that the rotor and stator form a first rotor-stator module of the machine, wherein the machine includes a plurality of rotor-stator modules each substantially as the first module and axially-adjacent thereto, with each rotor being mounted on the rotatable member.

By axially-stacking modules in this way, it is possible to increase the power output of the electrical machine, with only a small increase in the size of the machine.

Preferably, in each module, the stator includes two stator portions and the rotor is mounted between the two stator portions for rotation relative thereto. The stator portions can be joined to each other. The stator portions can be separate from one another. Thus, the portions can appear as parts of a single stator, or as two separate stators.

Preferably, in each module, the rotor includes a plurality of permanent magnets thereon and the stator carries windings of an electrical conductor. One or more winding(s) can be provided on each stator portion. The electrical machine can be arranged such that, in operation, flux travels in a loop substantially axially through adjacent magnets of the rotor and substantially circumferentially though each of the stator portions. The flux can travel in a respective loop through each juxtaposed pair of magnets, travelling through each magnet of the pair in a different respective direction. The permanent magnets of the rotor can be arranged such that the polarity of each is opposite that of each immediately neighboring magnet.

Each magnet can extend through an aperture in the rotor. Preferably, the aperture is such that material of the rotor surrounds the magnet so as to act to locate the magnet in radial and circumferential directions. Each magnet can be flush with, or project beyond, surrounding material of the rotor on one side, and in at least one example on each side, of the rotor. Each magnet can be fixed on the rotor by an adhesive material provided between each magnet and material of the rotor. The adhesive material can be a glue.

The rotor can be a magnetically or electrically insulating material or some combination thereof. This assists in avoiding losses in the rotor, such as losses due to eddy currents, and assists in avoiding magnetic short circuits in the flux path. The rotor can be of a heat insulating material. The rotor of heat insulating material can be resistant to high temperatures. The rotor can be of a composite material.

The rotor can be a substantially flat disc with apertures formed therein, each aperture sized to receive a respective magnet. Each magnet can fit in the respective aperture such that surrounding material of the rotor acts to locate the magnet radially and circumferentially.

A cooling structure can be provided in each stator. The cooling structure can be provided adjacent each stator. The cooling structure can include channels therein for conveying a coolant fluid therethrough. The channels can be circumferentially-extending channels. In at least one example, the cooling structure is in contact with at least part of the stator of each module. The cooling structure can be in contact with each stator portion of each module.

The or each pair of axially-adjacent modules can have cooling structure sandwiched between the two modules thereof such that the cooling structure contacts one stator portion of one module and one stator portion of the other module. Additional cooling structure can be provided adjacent the stator portion at each axial end of the plurality of modules. The cooling structure in-between each juxtaposed pair of stator portions can define plural coolant-conveying channels at substantially the same axial position. The channels can be arranged such that coolant is conveyed at a plurality of different radial positions.

The stator can be a slotted stator having slots formed therein. The stator can be an annular disc having slots formed into each side thereof. The slots can extend radially.

At least one winding includes coils of an electrical conductor arranged around material of the stator, wherein the coils lie substantially in a plane extending radially and tangentially. Each coil can include several turns of one or more parallel conductors. Part of each coil can be accommodated in one of the slots formed in the stator. The winding can include some coils that are wound in one of a clockwise direction and an anticlockwise direction, and other coils wound in the other of the clockwise direction and the anticlockwise direction with respect to the some coils. As the winding progresses angularly around the stator, each of the some coils can have a pair of the other coils on each side thereof. Each pair of the other coils can be overlapping but staggered from one another such that they do not share a slot or slots. Each of the one coils can share a respective slot with part of each of the adjacent other coils to which it is immediately connected. There can be three windings connected to form a three-phase winding arrangement. Each winding can be angularly staggered with respect to each other winding.

According to a second aspect of this disclosure there is provided an axial-flux electrical machine including a rotor mounted adjacent at least one stator, the rotor being mounted on a rotatable member for rotation relative to the stator, and the electrical machine further including cooling structure defining a plurality of channels adjacent structure of the stator for conveying a flow of coolant liquid and thereby cooling the stator.

One of the factors that limits the power output of electrical machines is the temperature to which the machine rises during use. In general, an electrical machine must not be operated such that its temperature rises above or even approaches the temperature at which components begin to fail. As will be understood, at high temperatures, permanent magnets can become demagnetised, plastic insulators can melt, bearings can fail, lubricants can ignite and so on. Thus, effectively cooling an electrical machine can allow it to be operated at a higher power output than would otherwise be the case.

The cooling structure can form part of the stator and can be integral therewith. The cooling structure can be separate from the stator and can be arranged adjacent thereto and preferably in contact therewith.

Optional features of the first aspect of this disclosure can also be optional features of this second aspect.

According to a third aspect of this disclosure there is provided an axial-flux electrical machine including a rotor mounted adjacent at least one stator, the rotor being mounted on a rotatable member for rotation relative to the stator, wherein the rotor includes a plurality of permanent magnets thereon, with each magnet extending through an aperture in the rotor.

By providing apertures in the rotor and a magnet that extends through each aperture, the amount of magnetised material at angular locations of the rotor, for a given rotor thickness, is maximised. Thus, the strength of the excitation field set up by the permanent magnets is maximised for a given rotor thickness, thereby increasing the power density. This is particular the case for an arrangement in which the flux path includes flux passing all the way through the rotor in a axial direction from, for example, a stator on one side of the rotor to a stator on the other side of the rotor.

Another result of providing apertures in the rotor and a magnet that extends through each aperture is that the magnets can be securely located in both a radial and circumferential direction, these being two principal directions in which forces act on the magnets in use. This location is provided by surrounding material of the rotor abutting the magnets and retaining them in position.

Optional features of the first aspect of this disclosure can also be optional features of this third aspect.

According to a fourth aspect of this disclosure there is provided an axial-flux electrical machine including a rotor mounted adjacent at least one stator, the rotor being mounted on a rotatable member for rotation relative to the stator, wherein the stator includes at least one winding thereon that includes coils of an electrical conductor arranged around material of the stator, wherein the coils lie substantially in a plane extending radially and tangentially relative to the axis of rotation of the electrical machine.

Optional features of the first aspect can also be optional features of this fourth aspect.

According to a fifth aspect of this disclosure there is provided a wheel for a vehicle and an electrical machine according to any previous aspect of this invention, wherein one of the rotor and the stator is coupled to the wheel and the other of the rotor and the stator is arranged for fixing to structure of the vehicle such that the electrical machine can be used as a direct drive motor in rotating the wheel and thereby driving the vehicle.

The electrical machine can also be arranged to operate as a generator to slow the vehicle by regenerative braking.

According to a fifth aspect of this disclosure there is provided a vehicle including the wheel and electrical machine of the fourth aspect.

The vehicle can include a respective electrical machine coupled to each wheel in this way.

BRIEF DESCRIPTION OF THE DRAWINGS

Specific embodiments of the invention will now be described by way of example only and with reference to the accompanying drawings, in which.

DETAILED DESCRIPTION OF CERTAIN EXEMPLARY EMBODIMENTS

Figure 1:
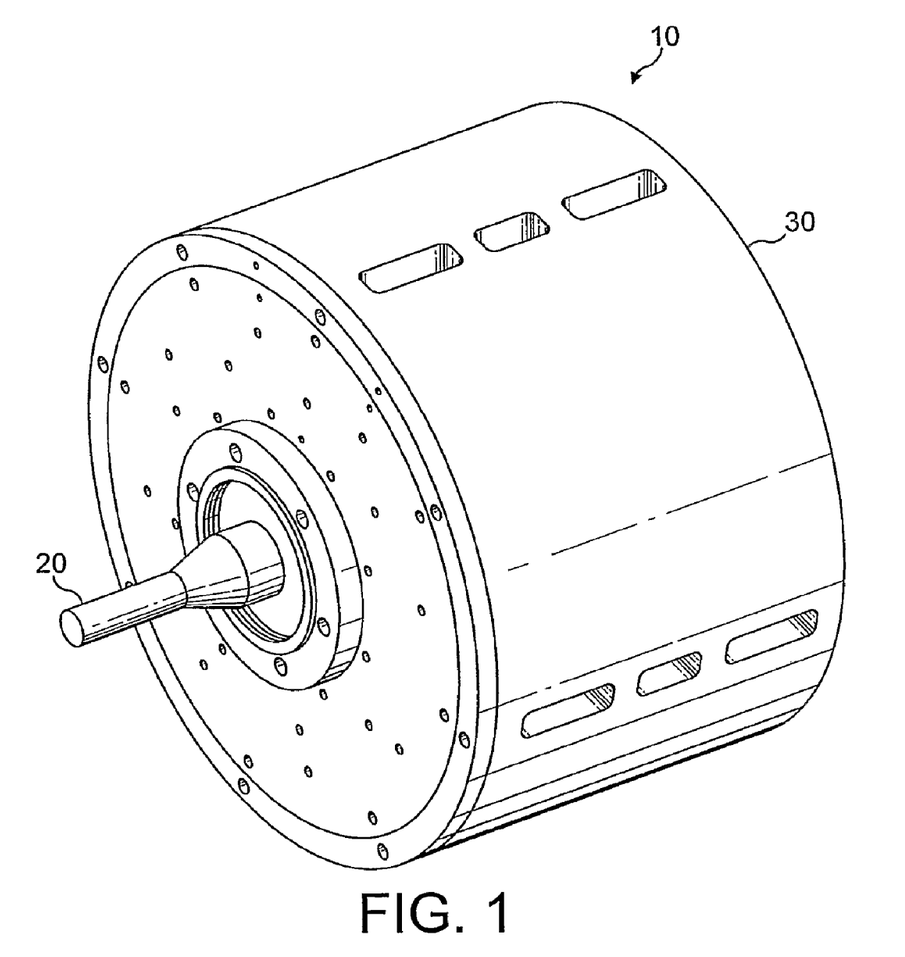
FIG. 1 is a perspective view of an axial-flux electrical machine that embodies the present invention.

FIG. 1 shows an axial-flux electrical machine 10 having a rotatable shaft 20 and a casing 30. The casing 30 is substantially cylindrical, and the shaft 20 projects from the casing 30 along the axis thereof.

Figure 2:
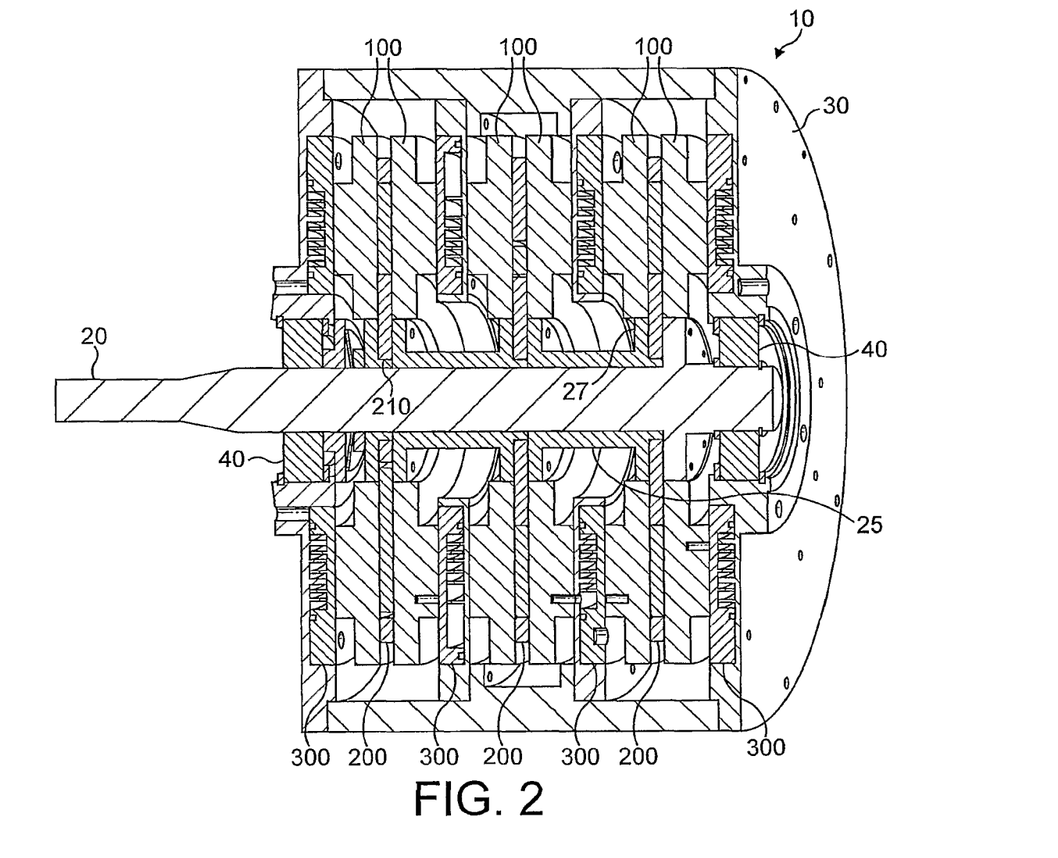
FIG. 2 is a sectional view of the axial-flux electrical machine of FIG. 1, the section being taken along the axis of the machine.

FIG. 2 shows the general arrangement of the electrical machine. With reference to FIG. 2, the casing 30 includes a bearing 40 mounted in each axial end thereof. The bearings 40 are mounted so as to be concentric with one another along the axis. The shaft 20 is rotatably mounted in the bearings 40 for rotation relative to the casing 30.

With continued reference to FIG. 2, the electrical machine 10 will now be described in general terms. The electrical machine 10 includes various static components that are fixed on or relative to the casing 30; and various rotating components that are fixed on or relative to the shaft 20. The rotating components are rotatable relative to the static components. The principle static components are the stators 100. There are six stators 100 in total, all spaced from one another along the axis of the electrical machine 10. The principle rotating components are the rotors 200. There are three rotors 200 in total; and, again, these are all spaced from one another along the axis of the electrical machine 10. The general arrangement is such that each rotor 200 lies between a respective juxtaposed pair of the stators 100. Thus, the electrical machine 10 can be seen to include three rotor-stator modules, with each module being made up of one rotor and two stators, the rotor between each of the two stators. In this way, each module can alternatively be considered as having a single stator made up of two stator portions 100. In this description, however, the electrical machine will be considered as having six stators 100.

Figure 3:
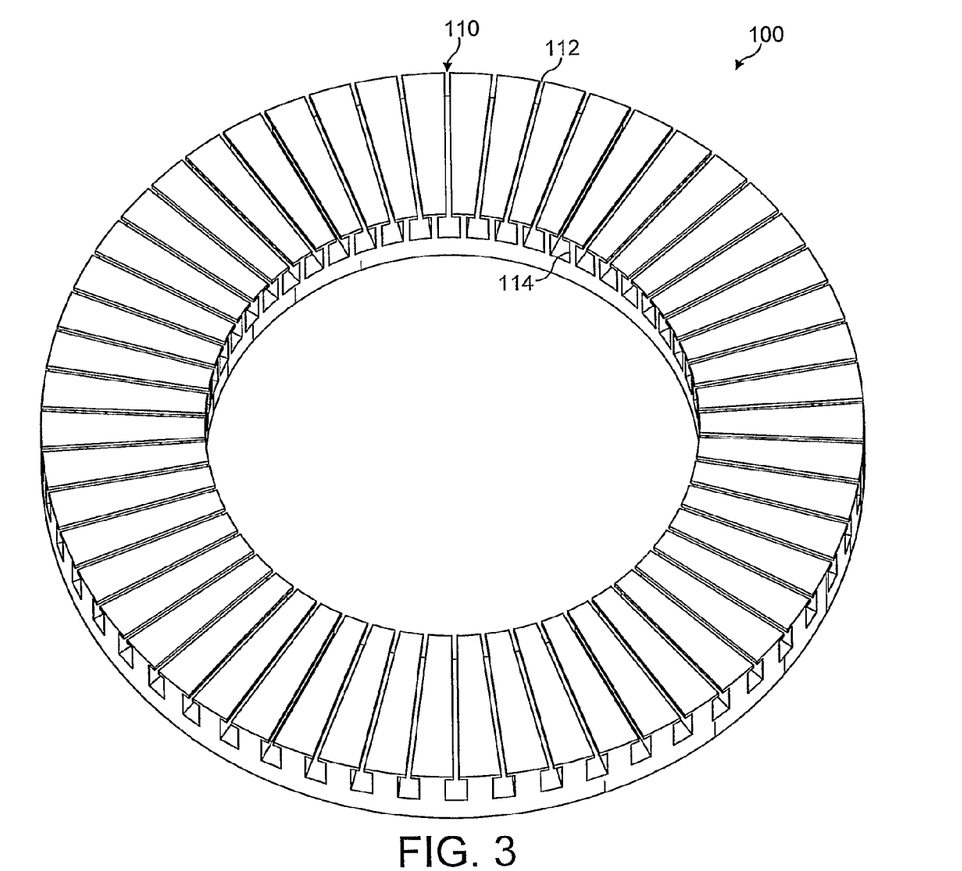
FIG. 3 is a perspective view of a stator of the electrical machine.

The stators 100 will now be described in more detail. Each stator 100 is of the same generally flat, annular, shape. This is shown in FIG. 3, which shows a representative one of the stators 100. With continued reference to FIG. 3, a first surface of the stator 100 has many slots 110 formed therein that extend in radial directions across that surface, from the inner edge of the annular stator 100 to the outer edge. Each slot 110 includes a narrow mouth 112 at the surface of the stator 100 leading to a wider slot cavity 114. In cross-section, with the section being taken circumferentially, the slot cavity 114 is generally rectangular, but with radii at the corners. The slots 110 are angularly spaced from each other with constant angular pitch.

In this embodiment, each stator 100 is formed from a single long strip of electrical steel. This is not visible in the accompanying drawings. The strip has apertures punched in it all along one edge such that T-shaped projections remain between the apertures. The single strip is coated in an insulator and is then wound up into a roll to form the stator 100. The strip is wound up rather like a roll of adhesive tape. Once wound up, the apertures form the slots 110, with the T-shaped projections forming structure of the stator 100 in-between juxtaposed slots that define each mouth 112 and cavity 114. There are 54 slots in each stator 100.

Figure 4:
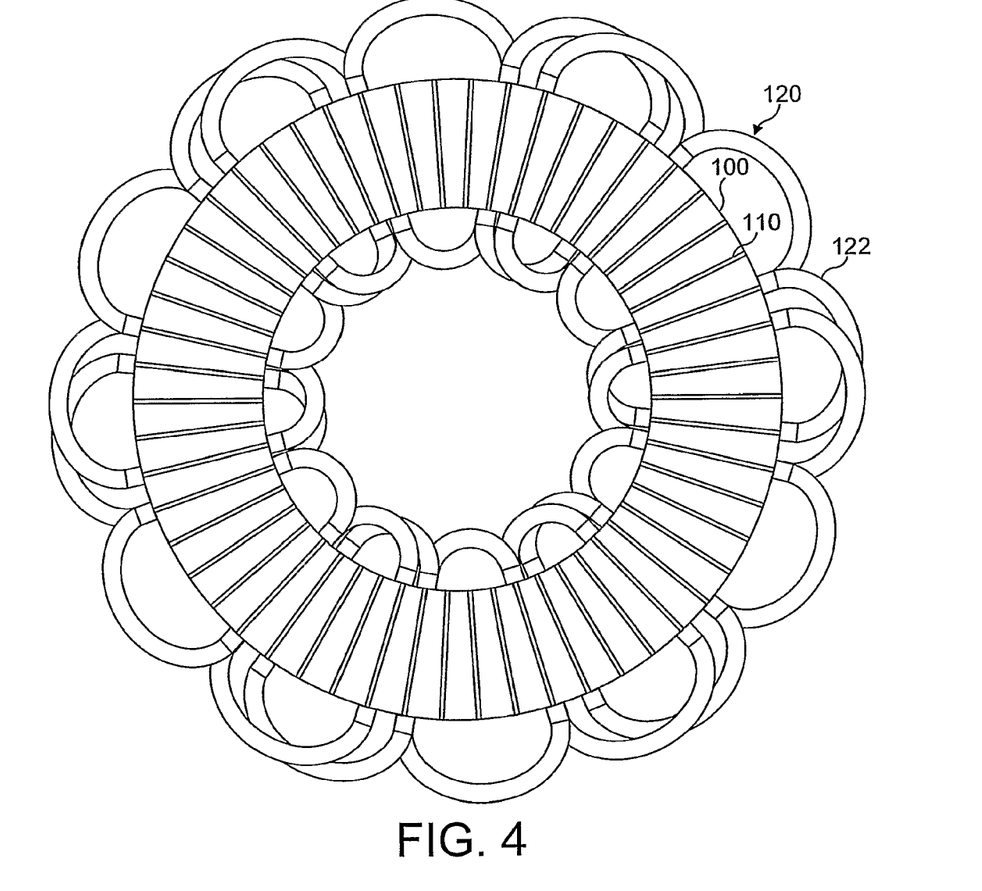
FIG. 4 is a perspective view of the stator with a winding thereon.

Each stator 100 carries windings of an electrical conductor thereon. FIG. 4 shows one representative stator 100 with a single winding 120. The winding 120 is made up of a cable of 16 parallel copper strands of approximately 0.5 mm in diameter. The winding 120 is arranged into many coils 122 that are accommodated in the slots 110 of the stator 100. Each coil 122 is placed in the slots such that one part of the coil 122 extends through one slot cavity 114 and another part of the coil extends through another slot cavity 114 spaced therefrom. Each coil 122 is formed from four turns of the cable in the two slots 110. In this embodiment, each coil 122 is accommodated in two slots 110 spaced apart from each other by four times the distance between juxtaposed slots 110. The winding 120 of FIG. 4 includes coils 122 that are wound in a clockwise direction with respect to the side of the stator 100 that includes the slots 110 and coils 122 wound in an anticlockwise (or "counter-clockwise") direction. There are twice as many clockwise coils 122 as anticlockwise coils 122. In winding the winding 120, coils 122 are wound sequentially in an angular progression around the stator 100. The winding of each anticlockwise coil 122 is followed by winding two clockwise coils 122. One part of a first-wound one of the two clockwise coils 122 is accommodated in one of the slots 110 that accommodates part of the anticlockwise coil 122, and the other part of the first-wound one of the two clockwise coils 122 is accommodated in another slot 110 spaced from the anticlockwise coil 122. The second-wound one of the two clockwise coils 122 overlaps the first-wound one, but is staggered therefrom by the distance between juxtaposed slots 110. The winding of the two clockwise coils 122 is followed by winding an anticlockwise coil 122 that shares a slot with the second-wound one of the two clockwise coils 122, but that otherwise does not overlap therewith. This winding pattern is repeated around the stator. There are six anticlockwise coils 122, and six pairs of overlapping, but staggered anticlockwise coils 122.

Figure 5:
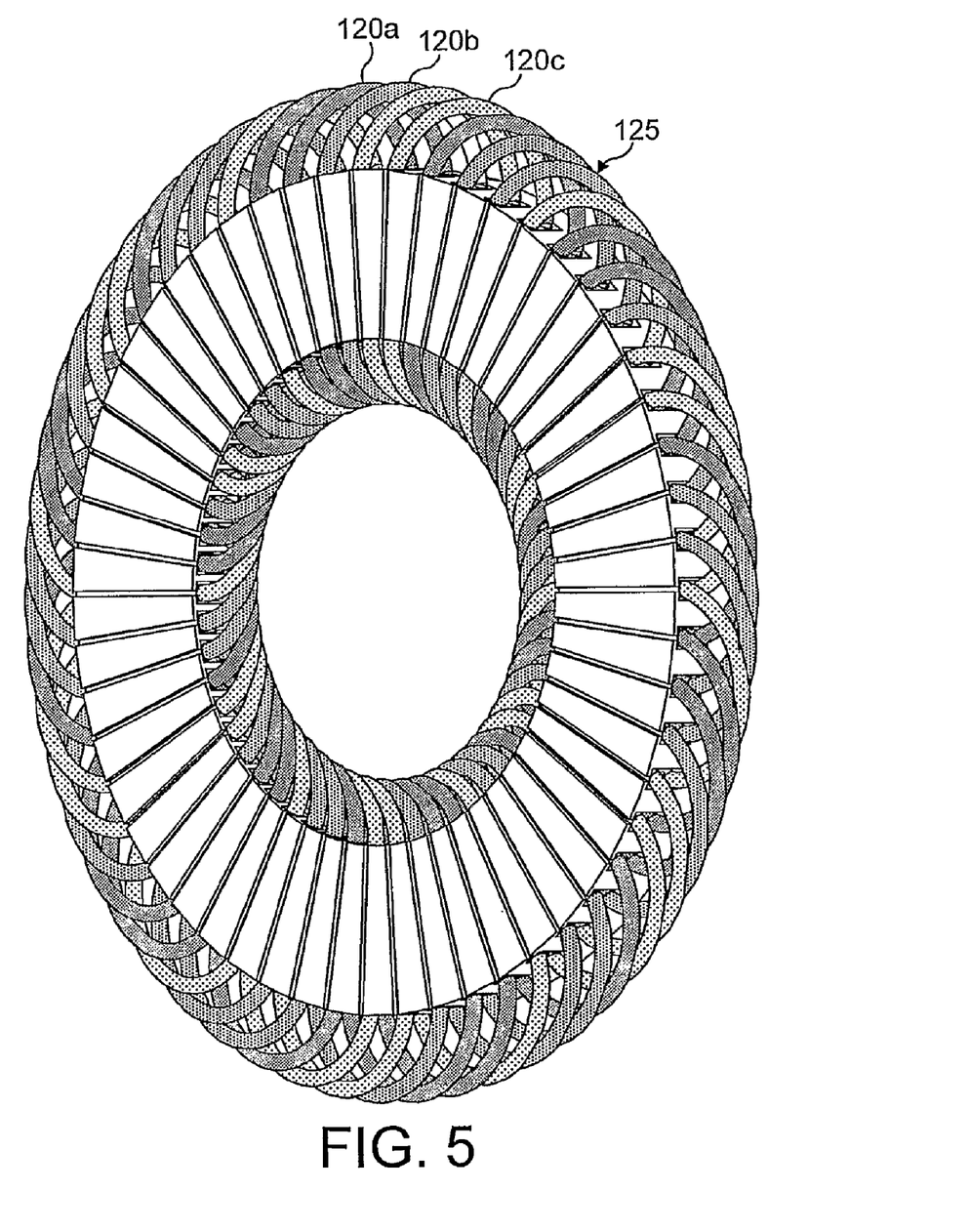
FIG. 5 is a perspective view of the stator and winding of FIG. 4, but with two additional windings thereon to form a three-phase winding.

As can be seen in FIG. 5, there are three windings 120a, 120b, 120c in total. These are connected together to in a star arrangement to form a three-phase winding 125. Each winding 120 is angularly displaced from each other winding 120 by 120 degrees. In alternative embodiments, a delta winding arrangement can be used.

Figure 6:
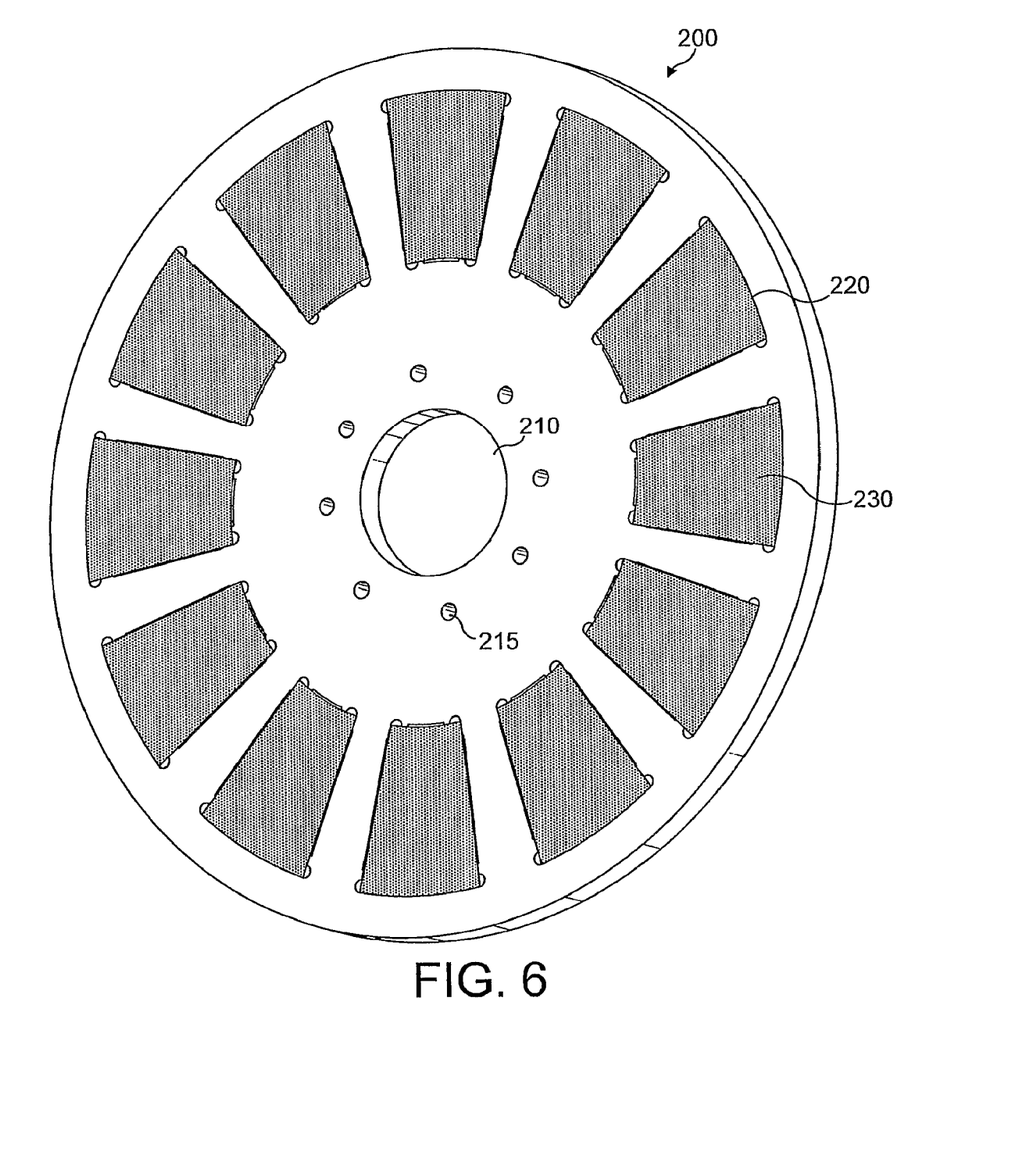
FIG. 6 is a perspective view of a rotor of the electrical machine.

The rotors 200 will now be described in more detail. As all the rotors 200 are, in this embodiment, intended to be the same, only one rotor 200 will be described. FIG. 6 shows a representative one 200 of the rotors 200. With continued reference to FIG. 6, the rotor 200 is a generally flat, thin, disc. It is formed from a composite material, which, in this embodiment, is a glass-fibre-and-resin-based cross-laminated material. The composite material is a good electrical insulator and a good thermal insulator. The rotor 200 has a central, round, aperture 210 through it. Eight smaller apertures 215 are formed through the rotor 200 in positions adjacent the central aperture 210 and so as to form, collectively, a ring around the central aperture 210 that is concentric with the central aperture 210.

The representative rotor 200 of FIG. 6 includes twelve apertures 220 therethrough, each aperture being shaped like a segment of a flat ring. Each of these apertures 220 is arranged adjacent the radially-outer edge of the rotor 200, and so as to be concentric therewith. The ring-segment apertures 220 are distributed around the rotor 200 with constant angular pitch. Each ring-segment aperture 220 has two concentric arcuate sides 222, concentric with the rotor 200, and two straight sides 224 in-between the arcuate sides and extending radially. As is shown more clearly in FIG. 7, sides of the apertures 220 are slightly recessed along much of their length with respect to the ends of the sides. This is true of the radially-innermost of the arcuate sides 222 and the two radial sides 224. Thus, there are projecting surfaces 226 towards the ends of each of the sides 222, 224 that are slightly recessed. It is envisaged that the ring-segment apertures 220 be formed in the rotor 200 by milling.

Figure 7:
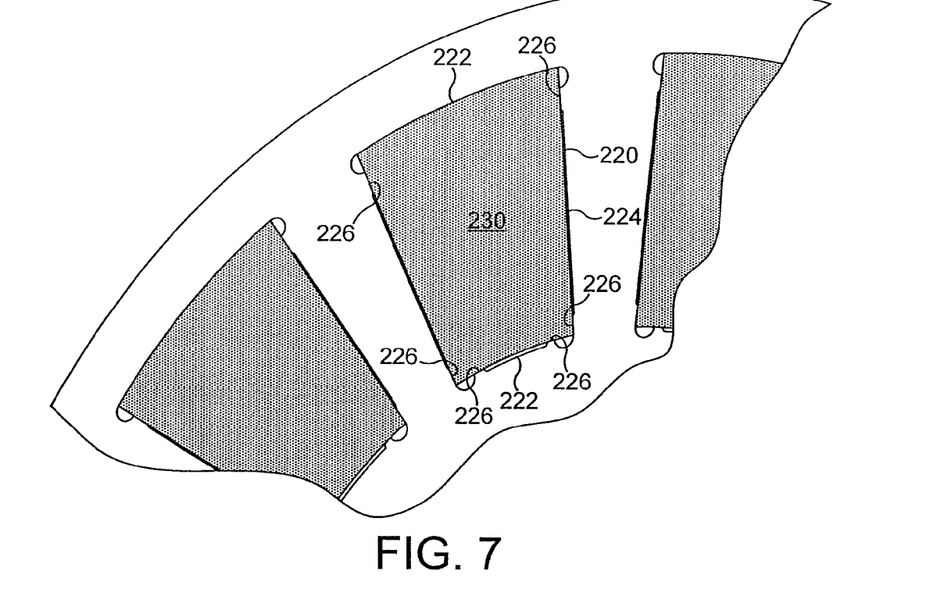
FIG. 7 is a detailed view of part of the rotor of FIG. 6.

As can be seen from FIG. 6, a permanent magnet 230 is provided in each ring-segment aperture 220. The magnets 230 are also shaped as segments of a flat ring, with two arcuate and concentric sides and two straight and radially-extending sides therebetween. With reference to FIG. 7, it should be noted, however that none of the sides of the magnets 230 are recessed. The magnets 230 are further sized and shaped such that each fits in one of the ring-segment apertures 220 such that sides of the magnets 230 are abutted by the projecting surfaces 226, and the radially-outermost arcuate side of each magnet 230 is abutted by structure of the rotor 200 defining the radially-outermost arcuate side of the respective aperture 220. Thus, each magnet 230 is located radially and circumferentially with respect to the rotor 200. It will be appreciated that this arrangement gives rise to gaps between the sides of the magnets 230 and the recessed parts of sides of the apertures 220. An adhesive material, which in this embodiment is glue (not shown in the drawings), is provided in these gaps to provide adhesion between the magnets 230 and surrounding structure of the rotor 200. This retains the magnets 230 axially with respect to the rotor 200. The magnets are of a thickness such that surfaces of the magnets are flush with each side of the rotor 200 when positioned in the apertures 220 therethrough.

The magnets 230 are mounted on the rotor such that each has its polarities reversed with respect to its two immediate neighbours. Each magnet has two principle pole surfaces, these are the surfaces that are flush with the surfaces of the rotor 200.

With reference to FIG. 2, the rotors 200 are mounted on the shaft 20 of the electrical machine 10. The diameter of the shaft 20 is such that the shaft passes with clearance through the central aperture 210 of each rotor. Spacing collars 25 are provided between the shaft 20 and the rotors 200, such that the rotors 200 fit on the collars 25 and the collars 25 fit on the shaft 20. The collars fit on the shaft 20 so as to angularly fixed relative thereto. Two such collars are provided: one on each side of the central one of the rotors 200. The collars 25 also have flanges 27 at each of their axial ends. These serve axially to abut the rotors 200 and axially to space them along the axial length of the shaft 20. The flanges 27 each have eight apertures therein arranged to align with the eight smaller apertures 215 in each rotor 200. The rotors 200 are secured to the collars 25 by suitable fixing means extending between the apertures in the collar flanges 27 and the aligned apertures 215 in the rotors 200. It is envisaged, for example, that bolts (not shown) can be used.

As can also be seen in FIG. 2, the static components of the electrical machine 10, that is those fixed in the casing 30, further include cooling structure in the form of four heat exchangers 300. The heat exchangers 300 are also generally flat, annular, discs. The heat exchangers 300 are positioned in the electrical machine 10 such that each is against at least one stator 100, on the side of that stator 100 that is remote from the adjacent rotor 200. This side will be referred to as the "back" side of the stator 100. Thus, one heat exchanger 400 is provided on each side of the central rotor-stator module, and is sandwiched between that module and a respective one of the two outer modules. Of the remaining two heat exchangers 300, one is provided against the outermost stator of each of the two outer modules. Thus, starting at one axial end of the machine and working towards the other, the layout is: heat exchanger; stator, rotor, stator; heat exchanger; stator, rotor, stator; heat exchanger; stator, rotor, stator, heat exchanger.

Figure 8:
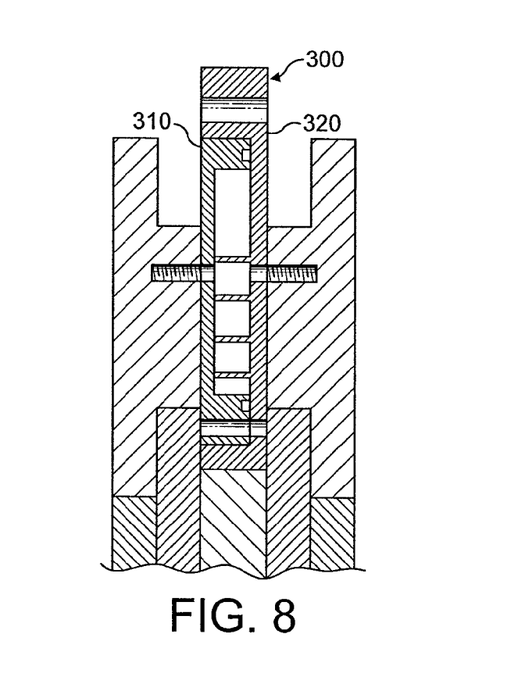
FIG. 8 is a sectional view of a heat exchanger that forms cooling structure of the electrical machine between two stators, the section being taken along the axis of the machine.

Each of the heat exchangers 300 is intended to be the same as each other heat exchanger 300. One heat exchanger 300 only is therefore shown in FIG. 8. As can be seen in FIG. 8, the heat exchanger 300 is of two-piece construction, including an inner part 310 and an outer part 320. The inner part 310 fits within the outer part 320. The inner 310 and outer 320 parts of the heat exchanger 300 are made of non-magnetisable material, which in this embodiment, is aluminium.

Figure 9:
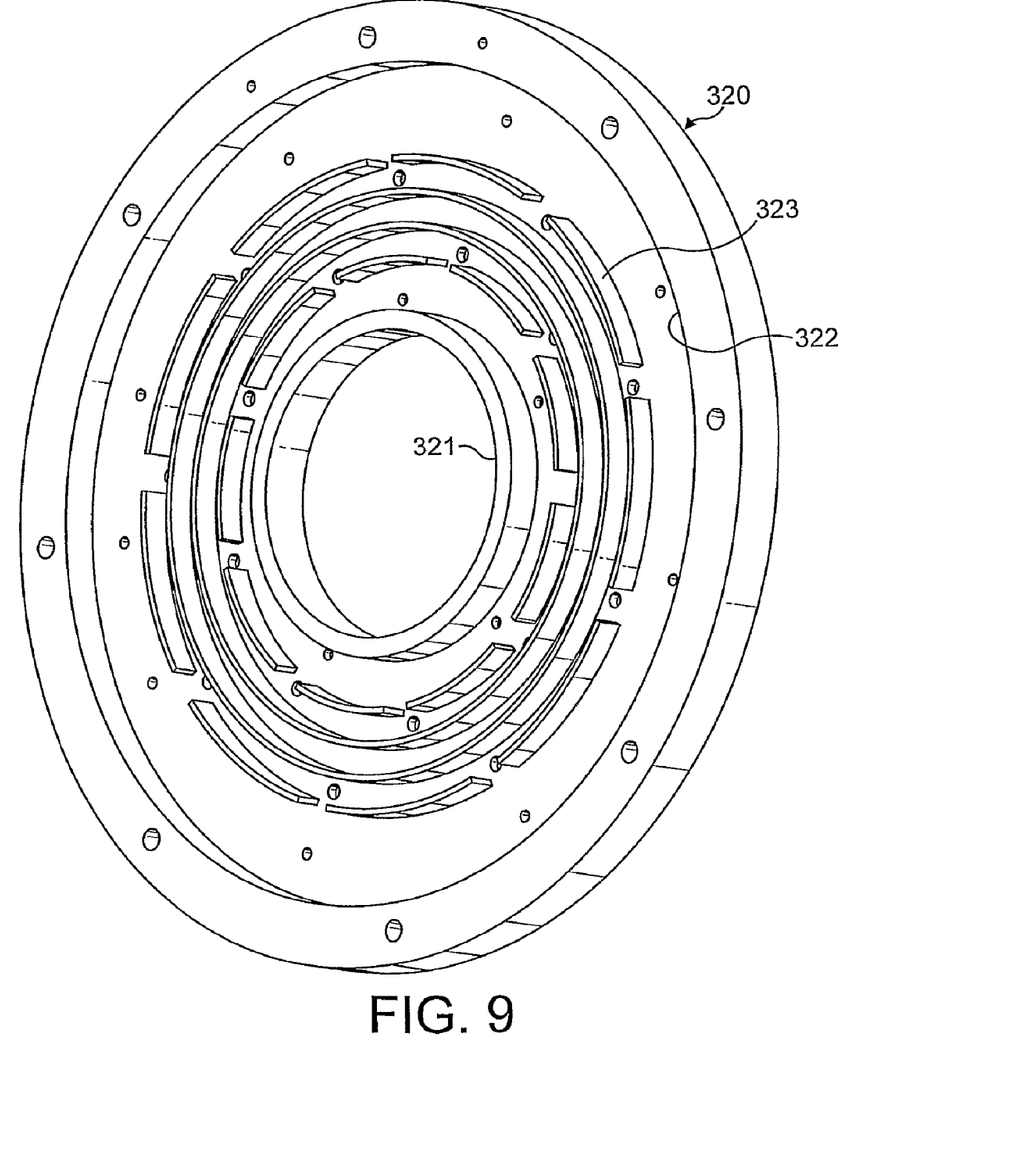
FIG. 9 is a perspective view of an outer part of the heat exchanger.

FIG. 9 shows the outer part 320 of the heat exchanger of FIG. 8 more completely. The outer part 320 is a flat disc with a central aperture. It includes an inner wall 321 projecting from around the aperture to one side of the disc. This side will be termed the "inner side". The outer part 320 also includes an outer wall 322 projecting from the periphery of the inner side of the periphery of the disc. On the inner side, between the outer wall 322 and the inner wall 321 a number of concentric, circumferentially-extending fins 323 project from the outer part 320. There are four concentric rings of fins 323. The outer ring is made up of nine discontinuous fins 323 of equal length, each equally spaced from its neighbours by a small gap. The next radially-innermost ring is a single continuous fin 323. The same is true of the next radially-innermost ring. The inner ring is similar to the outer ring in being made up of nine, equally spaced, discontinuous fins 323. Several small holes are provided through the outer wall 322 of the outer part 320 and through the outer part 320 in the region of each gap between neighboring fins 323.

Figure 10:
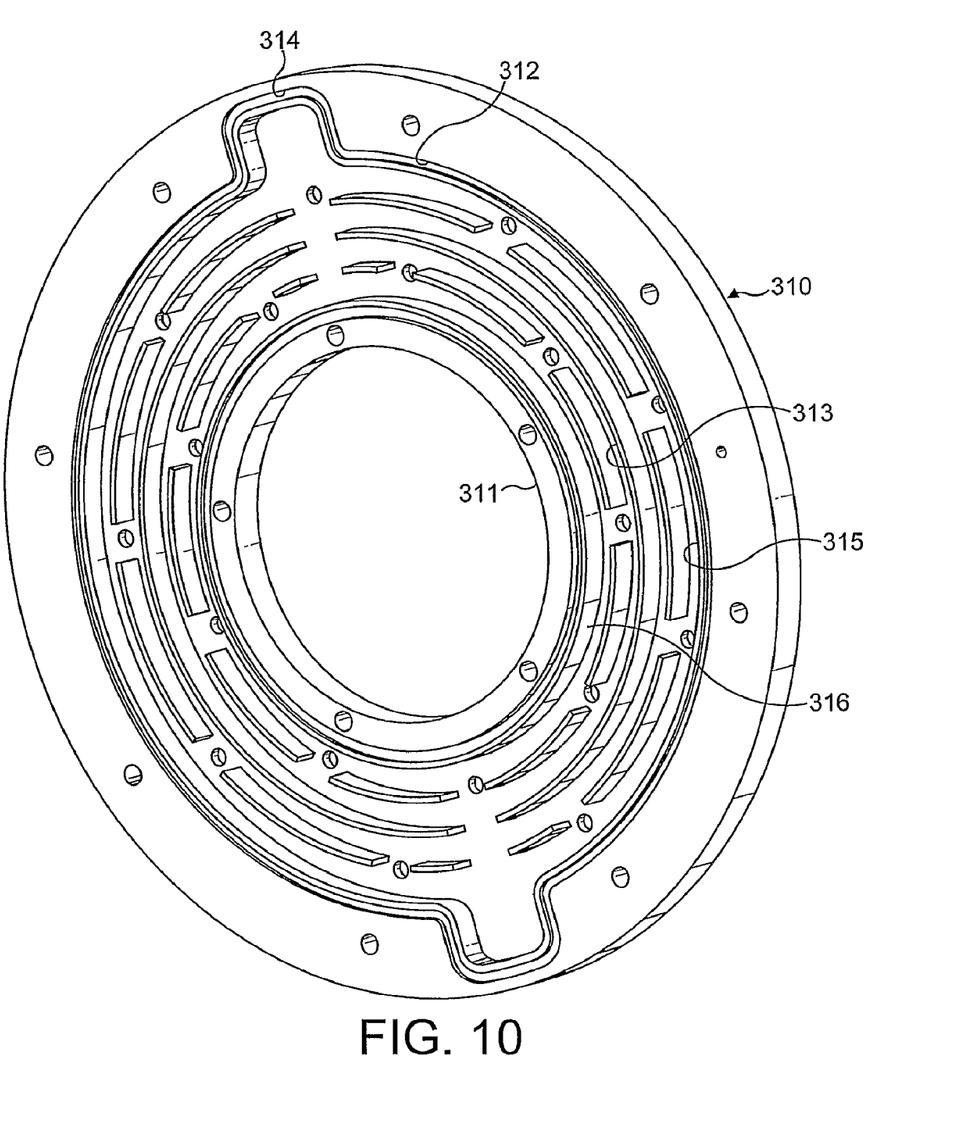
FIG. 10 is a perspective view of an inner part of the heat exchanger.

FIG. 10 shows the inner part 310 of the heat exchanger of FIG. 8. The inner part 310 is similar to the outer part 320 in having an inner wall 311 at an outer wall 312 arranged in much the same way. Although the outer wall 312 is the same height from the inner part 310 are all points along its length, the outer wall 312 becomes thinner in a radial direction in two, diametrically opposed, areas. This forms two recesses 314 in the outer wall 312. A hole (not shown) is provided through the inner part 310 in the region of each recess. The inner part 310 includes three concentric rings of fins 313 projecting therefrom between the inner 311 and outer 312 walls. Each ring is discontinuous with there being gaps between the respective fins 313 in that ring. Each ring includes gaps in the region of the two recesses 314 and can include gaps in other locations. Holes for stator mounting are provided through the inner part 310 in the region of the gaps in those other locations. The inner part further includes an outer gasket seal 315 against the radially-inner side of the outer wall 312; and an inner gasket seal 316 against the radially-outer side of the inner wall 311.

FIG. 8 shows how the inner part 310 and the outer part 320 fit together. The whole of the inner part 310 fits in the space between the inner wall 321 and outer wall 322 of the outer part 320. When the two parts 310, 320 of the heat exchanger 300 are placed together like this, the fins 313 of the inner part 310 interdigitate with the fins 323 of the outer part 320; and the gasket seals 315, 316 seal the volume around the fins 313, 323. Thus, a series of concentric circumferential channels are formed within a sealed volume between the two parts 310, 320 of the heat exchanger 300.

Each stator 100 is retained in position in the electrical machine by being fixed to the respective adjacent part 310, 320 of the heat exchanger 300. This is shown in FIG. 8. As can be seen in FIG. 8, a screw is provided from each part 310, 320 into structure of the respective adjacent stator 100. Many such screws are used to fix the heat exchanger to the stators 100. These screws pass through the holes in between fins 313, 323 in each part 310, 320 of the heat exchanger 300.

The electrical machine 10 is a 12-pole, three-phase electrical machine.

In operation, the permanent magnets 220 on each rotor 200 set up a respective excitation field around that rotor 200. Taking one rotor 200 as representative of all the rotors 200, the flux path of the excitation field about that rotor 200 is as follows: from a north-seeking pole of each magnet 230 across the airgap between the rotor 200 and the stator 100 on a first side of the rotor 200; into that stator 100; through the stator 100 in a circumferential direction to a position opposite the south-seeking pole of one of the two neighboring magnets 230; back across the airgap and into the south-seeking pole of the neighboring magnet 230; through the neighboring magnet 230; out of the north-seeking pole of the neighboring magnet 230 and across the airgap on the other side of the rotor 200; into the stator 100 on that other side; circumferentially through the stator 100 to a position opposite the first magnet 230; out of the stator 100, and back across the airgap into the south-seeking pole of the first magnet 230 to complete a closed loop. Thus, the excitation field for each rotor 200 is made up of closed loops of flux between each pair of juxtaposed magnets 230, with each loop passing though both of the stators 100 on each side of the rotor 200.

In operation as a generator, rotary power relative to the casing 30 is applied to the shaft 20. This causes the shaft 20 and hence the rotors 200 to rotate relative to the casing 30 and the stators 100. Thus, the excitation field associated with each rotor 200 also rotates. As a result, the closed loops of flux between adjacent magnets 230 rotate and pass, one after the other, through each coil 122 of the windings 120 on the stators 100. As flux in each loop travels in an opposite direction to that in each neighboring loop, each coil 122 is subjected to an alternating magnetic field upon rotation of the rotors 200. This alternating magnetic field in and around each coil induces an emf (electromotive force) in each coil, creating a potential difference across ends of each winding 120 and thereby allowing electrical current to be drawn from the windings 120.

Given the foregoing description, the person skilled in the art will appreciate how the electrical machine 10 can alternatively be operated as a motor. Briefly, therefore, in operation as a motor, the windings 120 are connected such that an alternating current exists in each winding 120 that sets up a respective magnetic field around the coils 122 of each winding 120 that interacts with the magnetic field associated with the rotors 200 to cause the rotors 200, and hence the shaft 20, to rotate. Position sensors can of course be provided in order to operate the electrical machine 10 as a motor.

The electrical machine 10 of this embodiment is suited to high power applications. For example, the electrical machine 10 can be suited to use as a generator in a diesel-electric generator set in a large hybrid-vehicle such as a tram or a bus. The electrical machine can also be suited to use as a motor in such a vehicle for providing automotive mechanical power.

In another embodiment that is not illustrated, an alternative electrical machine is envisaged. The alternative electrical machine is similar to that described above with reference to the accompanying drawings, but is simplified in having only a single rotor-stator module. Thus, the alternative electrical machine has a single rotor between a single pair of stators. As will be appreciated from the foregoing description of the cooling structure of the first embodiment, only two heat exchangers would be provided in this alternative embodiment: one heat exchanger against each stator, on the side of the stators that is remote from the rotor.

The alternative electrical machine of this other embodiment can be suited to lower power applications. Additionally, the alternative electrical machine can be suited to applications with greater packaging constraints. For example, the alternative electrical machine can be suited to use as a direct-drive motor in a wheel hub of a passenger car or other vehicle.

In other embodiments, the electrical machine can have two, four or even more rotor-stator modules.

In a further embodiment, the electrical machine described above with reference to the drawings is further modified so as to be capable of operation as an eddy current motor. In this further embodiment, the rotor disc described above is replaced by a disc formed at least partly of an electrically conductive material. Applying a varying current to the stator winding causes the machine to operate as an eddy current motor. Applying a constant would acts to brake the machine. The conductive material can be arranged to channel the current induced therein. This can be done by the provision of slots in the conductive material of the replacement rotor. The slots can be radial. In other words, the rotor could form an equivalent of the squirrel cage sometimes used in radial electrical machines.

The invention claimed is:

1. An axial-flux electrical machine comprising a rotor-stator module of the machine, the rotor-stator module including a stator having first and second axially spaced stator portions, and carrying windings of an electrical conductor thereon, a rotatable member which extends at least between the stator portions, along the axis of rotation of the machine, and which is rotatable with respect to the stator portions, and a rotor mounted on the rotatable member, the rotor being located adjacent and between the stator portions, and including a series of circumferentially-distributed magnets thereon wherein the rotor-stator module includes a first cooling structure in contact with the first stator portion, the first cooling structure including channels therein for conveying a coolant fluid therethrough, and a second cooling structure in contact with the second stator portion, the second cooling structure defining channels therein for conveying coolant fluid therethrough.

2. An electrical machine according to claim 1, wherein the machine includes a plurality of such rotor-stator modules arranged to form a series of modules located coaxially along the axis of rotation of the machine, the series having a first module and a last module, and the rotatable member extending through the series of modules along the axis of rotation, wherein each module, except the first module, is arranged such that the first cooling structure thereof is in contact with the second stator portion of the previous module in the series, and wherein the second cooling structure is provided on the last module of the series, in contact with the second stator portion of that last module.

3. An electrical machine according to claim 1, wherein each cooling structure is provided by a heat exchanger comprising an outer part having a substantially flat annular disc portion from which an inner wall, a first plurality of fins, and an outer wall project, an inner part having a substantially flat annular disc portion from which an inner wall, a second plurality of fins, and an outer wall project, wherein the inner part is located inside, and in contact with, the outer part, such that the outer wall of the inner part is radially inward of the outer wall of the outer part, and the inner wall of the inner part is radially outward of the inner wall of the outer part, and such that the first and second plurality of fins interdigitate so as to form a series of circumferential channels which provide the channels of the cooling structure.

4. An electrical machine according to claim 1, wherein, in use, a flux travels in a loop substantially axially through adjacent, circumferentially-distributed, magnets of the rotor and substantially circumferentially through each of the stator portions.

5. An electrical machine according to claim 4, wherein the magnets are arranged in pairs, and the flux travels in a respective loop through each pair of magnets, travelling through each magnet of the pair in a different respective direction.

6. An electrical machine according to claim 1, wherein the rotor includes a series of circumferentially-distributed magnets thereon, wherein each magnet extends through an aperture in the rotor.

7. An electrical machine according to claim 6, wherein the aperture is such that material of the rotor surrounds the magnet so as to act to locate each magnet in radial and circumferential directions.

8. An electrical machine according to claim 6, wherein each magnet projects beyond the surrounding material of the rotor on at least one side of the rotor.

9. An electrical machine according to claim 1, wherein each magnet is fixed on the rotor by an adhesive material provided by each magnet and material of the rotor.

10. An electrical machine according to claim 1, wherein the rotor is of a magnetically or electrically insulating material.

11. An electrical machine according to claim 1, wherein the rotor is a heat insulating material.

12. An electrical machine according to claim 1, wherein the rotor is formed from a composite material that is a glass-fibre-and-resin-based cross-laminated material.

13. An electrical machine according to claim 1, wherein the cooling structure defines plural coolant-conveying channels at substantially the same axial position and arranged such that coolant is conveyed thereby at a plurality of different radial positions.

* * * * *